March 10, 1964 W. J. WASYLENKO 3,124,789

MOUNTING DEVICE FOR MULTIPLE MAGNETIC TRANSDUCER ASSEMBLIES

Filed Aug. 19, 1958

INVENTOR.
WILLIAM J. WASYLENKO

BY

Carl Fissell Jr.

AGENT

United States Patent Office 3,124,789 Patented Mar. 10, 1964

3,124,789

MOUNTING DEVICE FOR MULTIPLE MAGNETIC TRANSDUCER ASSEMBLIES

William J. Wasylenko, Philadelphia, Pa., assignor to Burroughs Corporation, Detroit, Mich., a corporation of Michigan Filed Aug. 19, 1958, Ser. No. 755,915
1 Claim. (Cl. 340—174.1)

This invention relates to mounting apparatus for supporting multiple magnetic transducer assemblies adjacent to magnetizable record members, and more particularly, although not necessarily exclusively, to a novel electromagnetic transducer mounting structure for mounting two transducer assemblies adjacent to a pair of rotatable magnetizable discs such that one transducer may be operatively associated with the bottom surface of one disc while the other transducer may be operatively associated with the top surface of the adjacent disc.

It is known in the magnetic recording art to mount a plurality of transducer assemblies adjacent a magnetizable record member so that parallel recordings or reproductions can be made thereon or information picked up therefrom. One of the undesirable features of such structures is that when such transducer assemblies are used with disc type record memory means for example, it is difficult to closely stack the transducer assemblies in a relatively small area, and still be able to move the transducers relative to the record disc so as to utilize all of the available recording area.

To overcome this difficulty it has been suggested to provide a dynamic magnetic recording system employing a stack of thin recording members having a magnetizable surface on each side thereof and to read or record information on the surfaces of the discs by a single transducer for each disc surface, thus to provide an extremely flexible low volume, low cost record storage media.

A memory bank consisting of for example, forty discs could thus occupy a relatively small storage area while providing a very high recording track density of 100 tracks per disc side. In addition it would provide high pulse packing density and extremely high availability of information. However, with such discs it is difficult to obtain perfectly planar surfaces as most such discs surfaces have a small amount of surface undulation or "runout." With known head mounting techniques, the variation in the head to disc spacing due to such undulations causes irregular changes in the strength of the recorded or the read signal such as in some cases to cause the signal to be lost altogether or for signals from one track to be misread as signals from an adjacent track. In addition, if the undulations are of too great an extent there is always the possibility of damage to the head or disc since generally speaking, the head assembly will follow the fluid path which undulates with every defect, hollow or other aberration in the disc. Modification of the head assemblies along with the surface of the recording media to provide closer tolerances therebetween only tends to multiply the problems in each individual assembly.

Other applications assigned to the assignee of the present invention, such as the application in the names of Herman Epstein and Oscar B. Stram, Serial No. 519,218, filed June 30, 1955, now Patent No. 2,957,051, show electromagnetic transducer assemblies mounted adjacent to a magnetizable record member so that the transducer assembly is caused to float on a fluid film of air, generated by the rotation of the recording mechanism adjacent to the transducer assembly. Such air floating mountings have been particularly useful in overcoming the problem presented by "runout" on disc surfaces.

Therefore, it is the primary object of the present invention to provide a novel mounting structure for multiple transducer assemblies which overcome the foregoing difficulties.

It is another object of the present invention therefore, to overcome the aforesaid difficulties by providing a transducer mounting assembly adapted to coact with adjacent rotating discs of a stack of discs for air guiding transducers over opposed adjacent disc surfaces.

It is a further object of the present invention to provide a transducer mounting structure which permits a pair of transducers to undulate with surface irregularities of the disc with which each is associated while preventing transfer of the undulation of one to the other transducer structure.

It is a still further object of the present invention to provide a mounting means for dual air guided transducer assemblies whereby the transducer assemblies may undulate freely with respect to the rotating discs while remaining fixed with respect to the transducer track traversing assembly.

According to the principles of the present invention, and first briefly described, there is provided in one embodiment thereof, a mounting assembly for a pair of electromagnetic transducers disposed in side by side relation adjacent a pair of associated parallel, rotatable magnetic recording discs such that each transducer has a freedom of motion relative to the other and to the confronting surfaces of the recording discs.

More specifically, the assembly is mounted for movement traversing the space between the confronting surfaces of the recording discs. Still more specifically, the assembly includes a plurality of pairs of transducer assemblies operatively associated with a stack of recording discs and wherein means is provided for conjoint movement of pairs of transducers rectilinearly between the upper and lower surfaces of confronting recording discs in the stack.

Other objects will appear hereinafter:

Figure 1:
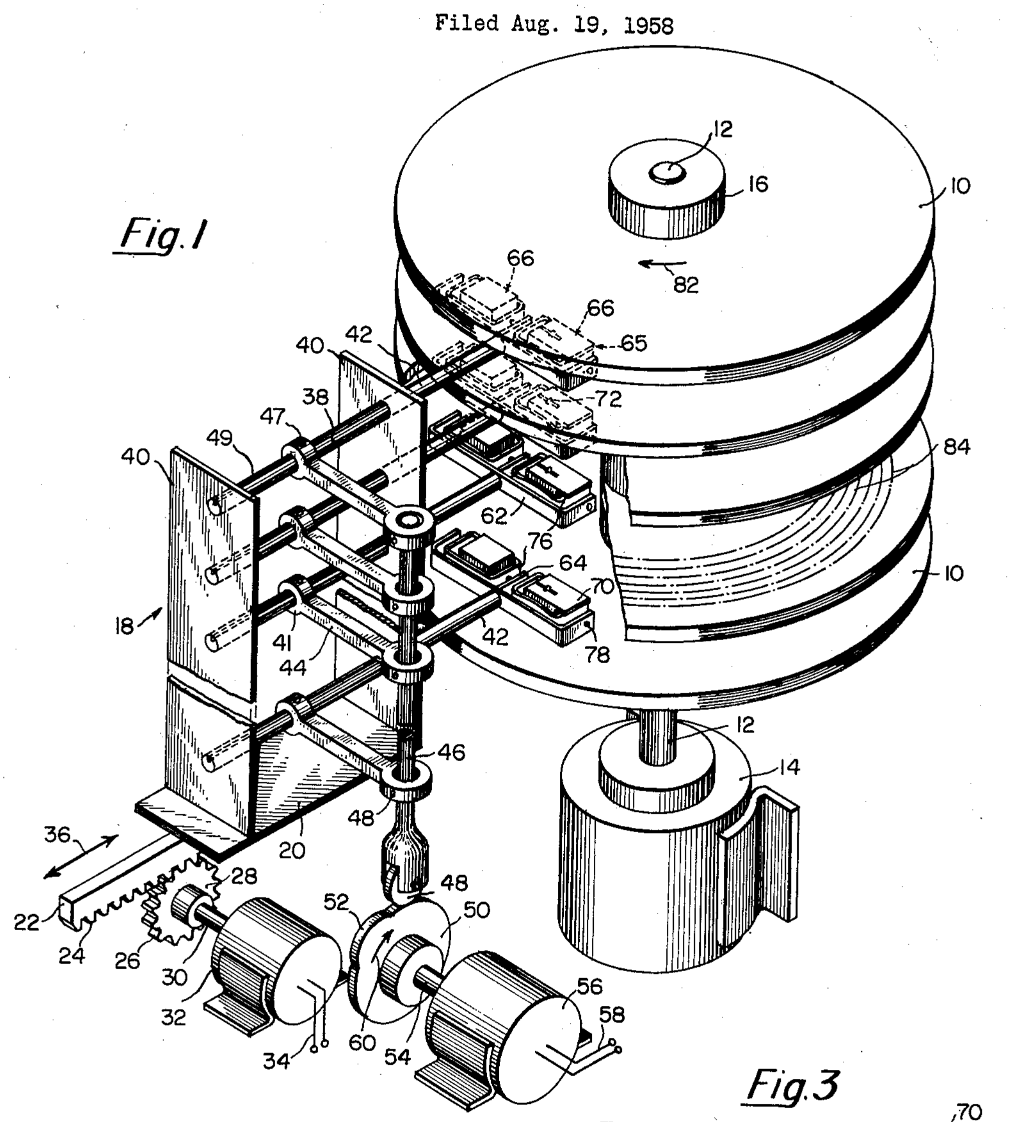
FIG. 1 is an isometric view of one embodiment of a structure utilizing the present invention.

The term "gimbel" is used throughout the present specification as a generic expression referring to means for permitting a body to incline freely in any direction or for suspending the body so that it will remain plumb or level when its support is tipped.

One form of such means consists generally in the present embodiment, of a rectangular member in which the body is pivotally mounted so that it can turn on an axis through the short dimension (width) of the rectangular member while the rectangular member itself is pivoted to a general supporting structure so that it can turn about a pivot disposed at right angles to the first.

The term "electromagnetic transducer" is used in this specification as a generic expression referring to such members as electromagnetic recording and play back heads for magnetic recording and reproducing apparatus, to an erase head for demagnetizing and desaturating the magnetic record member so as to condition it for magnetic recording operation, to a monitoring head for immediately utilizing a recording as it is being made. This expression is used whether the head is used for magnetically recording only or magnetic reproducing only or for selectively doing either.

The structure depicted in the various figures of the drawing is illustrated with five rotatable disc-like record members. However, it is to be understood that any reasonable number of record members may be employed. The actual number being a matter of design choice. Three separate motors or prime movers are shown. It is apparent that a single motor could be used together with a belt and pulley arrangement or a gear train interconnected to the motor to drive the various rotatable shafts associated therewith.

The surface of each disc i.e., top and bottom oppositely disposed parallel faces, are coated with a layer of magnetizable material such as nickel cobalt. However, other and varied magnetizable materials may be employed as design choice varies with the individual application.

The various views of the drawings are not drawn to scale simply to permit a clearer graphical portrayal of the parts of the invention. It is to be understood that the relative size of the individual parts of the herein described and claimed apparatus may actually be larger or smaller than that shown as application and/or design demands or requires.

The apparatus constituting one embodiment of this invention may be adapted for use as a self contained assembly, wherein the only external elements required are a source of power to drive moving parts and an electrical input and output for the transducers. Each transducer is provided with a ferrite or other type head structure including associated energizing windings, lead wires, plugs, connectors and means for interconnecting this electrical equipment into other associated apparatus for example, a computer.

Referring now to the drawings there is shown in FIG. 1 a plurality of disc-like magnetizable record members or discs 10, disposed in spaced stacked arrangement to rotate in planes parallel to one another on a shaft 12 which is rotatively coupled to an electrical motor 14. A hub nut or cap 16, fixed in any well known fashion to the shaft 12, secures all of the discs thereto as a unitary assembly. While not shown it is to be understood that each of the record discs 10 is coated with a magnetizable material on opposite parallel surfaces thereof, i.e., top and bottom surfaces. The magnetizable material is or may be electrically prerecorded upon or the disc surfaces may be recorded upon by means to be described hereinafter.

A considerable amount of surface waviness or "runout" is permissible with the construction provided by the present invention, and since each transducer is free to follow the surface irregularities of an associated disc, no damage to the transducer or disc therefrom can result. The apparatus is thus less expensive to build and maintain since the tolerances can be proportionably lower than with known structures. In one embodiment employing the present invention, a disc diameter of 10 inches is utilized and the stack of discs is rotated at a speed of 3580 r.p.m. As before mentioned, a transducer is used to record or read both sides of each disc. The spacing between the discs is on the order of .300 inch and the transducer heads are traversed radially one track pitch (.050 inch) per disc revolution. In another embodiment of this invention, the transducers can be caused to traverse across the record discs to read from or record upon randomly selected tracks.

In order to provide extremely close packing of discs and heads, a novel transducer mounting assembly and track traversing mechanism is employed with the present invention. Still referring to FIG. 1, a frame 18 is provided, the bottom portion 20 of which includes a rack 22, the teeth 24 of which engage the teeth 26 of a pinion 28 attached to the shaft 30 of an electric or other type of driving motor. Energization of motor 32 over leads 34 from a source of energy (not shown) causes the pinion to drive the rack rightwardly or leftwardly, depending on the direction the reading or recording is to be performed, moving the traversing mechanism in the directions of the double arrow 36. A plurality of horizontally disposed shafts 38 are pivotally supported in known fashion, between the two upright pedestal members 40 of frame 18 so that the rightwardly extending end portion 42 of each shaft 38 projects outwardly a sufficient distance to enter between a pair of discs 10—10. Each of the shafts 38 is provided with a laterally extending rocking arm 44. The leftward end 41 of arm 44 is secured to its respective shaft 38 by means of a set screw 47 seating in a keyway or groove 49 in the shaft 38. The keyway permits the arms 44 to slide along shafts 38 as the rack 22 is moved rightwardly or leftwardly by the motor 32. Each arm 44 is pivotally secured as by pin 48 at its rightward end, to a vertical control shaft 46, the end of which is provided with a cam follower wheel 48.

A cam 50 having a protuberance 52 thereon is attached to the output shaft 54 of a driving motor 56. A pair of leads 58 is adapted to connect the motor to a source of electrical energy, not shown. Energization of the motor causes cam 50 to be rotated in the direction of the arrow 60 so that the protuberance 52 will cause the shaft 46 to move vertically up and down rocking the arms 44 about their pivotal axes. As will become more apparent hereinafter, the shaft 46 is adapted to be moved into a selected position and stopped.

The rightwardly extending end portion 42 of each shaft 38 is provided with a novel mounting means which in the present embodiment comprises a substantially U-shaped frame 62 secured thereto in any suitable fashion, so that a rigid structure results. A flat extension 64 (FIG. 2) projects rightwardly in FIG. 1 beyond the U frame 62 for a purpose to be described later on.

Figure 2:
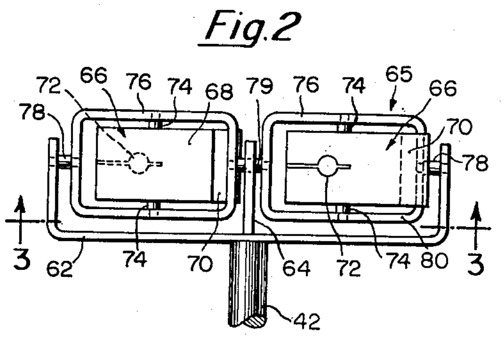
FIG. 2 is a plan view of a multiple gimbel arrangement for the transducer assemblies of the present invention.

Referring now more particularly to FIG. 2, there is shown the novel transducer mounting assembly 65 for supporting a pair of electromagnetic transducers in side by side relationship. Each transducer 66, which, as earlier mentioned herein, can be a recording head or a pick up head, depending on the use to which the head is to be put, comprises, a non-magnetic body portion 68 having on one surface thereof a projection or tab forming a slider shoe 70 for a purpose to be more fully described later on.

Figure 3:
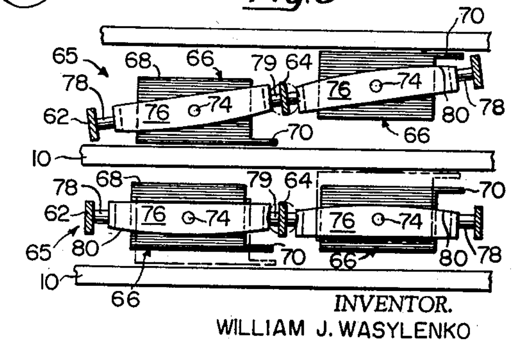
FIG. 3 is a front elevational view along the line 3—3 of FIG. 2 illustrating the heads in the operative and inoperative positions with respect to the record members.

Each transducer 66 is mounted by means of a pair of studs or pivots 74—74 forming gimbels, in a rectangular supporting structure 76 and is freely rockable about these pivots within the design limits of the structure, as shown most clearly in FIG. 3. It can be seen that the pivotal axis of each transducer within its associated structure 76 is slightly off center with respect to the long dimension of the transducer. This construction causes each transducer, when in its rest position, to be disposed at an angle with respect to the confronting record member. The shoe portion 70 is thus angled away from its associated recording surface.

An outboard stud or pivot 78 is attached to each leg of the U-shaped frame 62. A central pivot 79 is disposed on the fixed extension 64 of frame 62. Each supporting structure is thus mounted between a respective pair of pivots 78—79 at right angles to pivots 74—74 and is thus permitted a freedom of motion about pivots 78—79 perpendicular to that of each transducer.

In operation of the present invention when it is desired to read or record information on the surfaces of the magnetizable record members 10, the motor 14 is first brought up to speed, for example, 3580 r.p.m., as earlier stated herein. Motor 32 is then energized over the electrical conductors 34 causing the head mounting structure to move the transducers rightwardly into the space between parallel pairs of record members 10. The control arms 44 are slidable along the shafts 38 to the extent of the area between the two pedestals 40—40. This area is or may be a measure of the total recording area to be used.

When the transducers are positioned at the desired track 84, which need not be the first or the last track but any selected track, the elevator motor 56 is energized rotating cam 50 so that shaft 46 rocks arms 44 arcuately upwardly a slight distance governed by the actual head to disc spacing of the specific apparatus which can be larger or smaller than stated herein. For the greatest disc packing density this spacing is held to a very small tolerance and thus the head elevating mechanism moves a very small amount.

Referring now to FIGS. 1 and 3, it can be seen that the vertical upward movement of shaft 46, carrying the arms 44, will rock each of the transducer supporting shafts 38 about their respective pivotal axes. The rightmost transducer head as viewed in FIG. 3, will move arcuately upwardly while the leftmost transducer head will move arcuately downwardly. The slight distance traveled by each head being of such a small order of magnitude as to cause the heads to move in substantially a straight line motion.

The present invention utilizes a fluid bearing between the transducers and the discs which is produced by means substantially similar to that described and claimed in the above identified copending patent application of Herman Epstein and Oscar B. Stram.

As the discs 10 are driven in the direction of arrow 82 by the motor 14 a boundary layer of air is generated between the disc surface and the portion carrying the shoe 70 of the associated transducer 66 causing each transducer to come to rest in a position in close proximity to (without contacting) the disc surface. Each transducer pair is thus operatively associated with one pair of record discs such that one transducer reads from or writes upon one surface while the other transducer writes upon or records from the adjacent confronting record surface of the next parallel disc. With respect to FIG. 1, in the uppermost transducer mounting assembly the righthand transducer of this pair is operatively associated with the bottom surface of the associated disc while the lefthand transducer of this pair is operatively associated with the top surface of its associated disc and so on downwardly for each of the remaining pairs of transducers and recording discs.

Although a rack and pinion traversing mechanism has been illustrated in the present embodiment of the invention it is understood that other means for advancing the transducers over the associated record surfaces can be substituted therefor within the purview of the invention.

In the construction shown the member 62 can be said to act as a loading bar for each of the heads and is movably positioned as shown most clearly in the upper portion of FIG. 3.

The front and back portions of the rectangular frame 76 may be slanted as at 80, FIG. 3, so as to accommodate any overthrow motion of the shoe 70 should the head encounter any surface irregularity or waviness in the disc during rotation thereof or air turbulance as the associated disc comes up to speed. It can be seen that the head shoe portion 70 can move angularly a sufficient distance to override such undulation without encountering the rim of the member 76. In addition, due to the fact that the central pivot point 79 is fixed relative to the member 62, any shock or impact is absorbed by the U-shaped member 62 and the parallel side arms to which the transducer heads are also pivoted.

Means is thus provided for simultaneously or alternately reading both sides of parallel spaced apart record members. Further, it is possible with the present invention to stack record discs in a relatively small and confined area while still being able to read or record on top and bottom surfaces of adjacent discs with a high degree of speed and efficiency. In addition, since the bearing mechanism of the herein described apparatus utilizes a boundary layer of air, no lubrication is necessary and no wear results between the transducers and the surface of the record members. Extremely high head to disc spacing tolerances can be maintained with the device of this invention even though the surface of each disc may not of itself have an exceedingly high surface tolerance. That is to say, each disc may have a certain amount of surface irregularity or waviness i.e., runout, yet the heads, due to the natural turning and yawing motion permitted by the novel head mounting structure of the present invention, can be operated exceedingly close to each disc without damage to either the disc or the heads while still maintaining extremely close spacing therebetween.

What is claimed is:

Electromagnetic transducer mounting apparatus for use with movable record media comprising:

(*a*) a frame member including a pair of upstanding parallel arms, (*b*) a plurality of rigid bar-like members rockably mounted between said parallel arms and including an extension projecting away from one of said arms terminating in a reduced end portion, (*c*) each of said bar-like members being provided with a longitudinal groove extending at least the width of said frame member, (*d*) a yoke-shaped member carried by each extension of said bar-like member, (*e*) a rectangular frame member pivotally mounted on opposite sides of said reduced end portion between the outer end of each side of said yoke member and said end portion, (*f*) an electromagnetic transducer pivotally mounted within each said rectangular frame member at right angles to said frame member mounting effectively providing a gimbal mounting for said transducer, (*g*) a vertical shaft disposed adjacent to said frame member, (*h*) a rocker arm for each bar-like member one end of which is slidable in the groove in a respective bar-like member and the opposite end of which is pivoted to said vertical shaft and rockable therewith, (*i*) a rack and pinion for moving said frame member effective to impart horizontal motion to said transducers thereby to position said transducers between confronting record members with which each pair of transducers may be operatively associated, and (*j*) cam means driven by a source of rotative torque for moving said vertical shaft in opposite directions thereby to shift said bar-like members thus to move the transducers of each bar-like member in opposite directions relative to one another whereby to position each transducer adjacent the confronting surface of a respective recording member.

References Cited in the file of this patent

UNITED STATES PATENTS

| | | |
|---|---|---|
| 2,674,728 | Potter | Apr. 6, 1954 |
| 2,800,642 | May | July 23, 1957 |
| 2,862,781 | Baumeister | Dec. 2, 1958 |